Patented Feb. 17, 1942

2,273,722

UNITED STATES PATENT OFFICE 2,273,722

PREPARATION OF SOLID CAUSTIC

Irving E. Muskat, Akron, and Dwight R. Means, Wadsworth, Ohio, assignors to Pittsburgh Plate Glass Company, a corporation of Pennsylvania No Drawing. Application January 9, 1937, Serial No. 119,876

3 Claims. (Cl. 23—300)

The present invention relates to a process for treatment of the hydroxides of alkali metals, and it has particular relation to the conditions under which liquid caustic soda is caused to solidify to provide a partially or completely anhydrous product.

In the commercial production of hydroxides of alkali metals a relatively dilute solution of the hydroxide is initially obtained. In the case of caustic soda, the per cent of hydroxide (NaOH) does not usually exceed 8 to 12 per cent. For most commercial purposes these dilute solutions must be concentrated to at least 50 per cent, and in order to reduce transportation costs, it is preferable to concentrate them to the anhydrous state.

Evaporation of the 50 per cent caustic soda may be carried out in either of two ways. For example, the temperature of the liquor may be kept at such points as will prevent the deposition of any anhydrous caustic crystals until molten anhydrous caustic has been formed. This may be poured into drums to form solid cakes or it may be flaked.

Alternatively, the temperature during evaporation may be kept below the fusion temperature of the solid caustic so that as evaporation of the water proceeds, the composition of the liquid phase remains constant at the solubility value of NaOH for the particular temperature employed, and the excess caustic is deposited in the form of anhydrous crystals. A variation of this method involves bringing the caustic liquor to a predetermined temperature and concentration and then cooling to precipitate anhydrous caustic crystals from the solution.

If the first method is used, the caustic is kept liquid until it is anhydrous, the last stages of evaporation being carried out in open "caustic pots" heated by direct fire. This method is very wasteful of fuel and considerable contamination of the finished caustic soda takes place.

The second method, whereby anhydrous crystals of caustic are precipitated from solution, presents the advantages of the use of conventional vacuum evaporators with their excellent heat economy and the occurrence of the product in a finely divided form without further mechanical grinding.

In accordance with the present invention, we have been able to improve the conditions of evaporation of aqueous caustic liquors particularly with respect to the second of the foregoing processes. We have found that if caustic soda solutions are evaporated in the presence of a suitable nonreactive coating material, it will separate as a granular product, the individual particles of which are encased in coating films which prevent agglomeration and simultaneously render the product relatively free flowing. The walls and other parts of the apparatus which are employed in treating the caustic also become covered with a protective film that prevents corrosion and also acts as a lubricant between the surfaces and the solidified material.

In order to obtain the solid as anhydrous caustic soda, it is necessary to operate above 145 deg. F., which is the transition temperature between monohydrated and anhydrous caustic soda, and the solution must be concentrated to about 74.5%. In the preferred method of operation of this invention, 50 per cent caustic liquor is admixed with a coating agent and concentrated in a conventional evaporator, preferably under vacuum to decrease the boiling point. Upon reaching the crystallizing point, anhydrous caustic crystals will be precipitated. During the precipitation the caustic liquor and the coating agent, which will normally form two layers, are violently agitated and the small caustic crystals are caused to coalesce and form small granules. The size of the granules may be controlled by the rate of heat application and the degree of agitation. The evaporation may be continued until all of the caustic is present as anhydrous granules, or it may be stopped at any point and the granules separated from the liquid residue.

In acordance with a second method of operation, caustic liquor may be concentrated by evaporation to a suitable concentration, admixed with coating agent, and cooled so that the solution becomes supersaturated with respect to anhydrous caustic, which will thereupon precipitate. Because of the high degree of agitation employed, the anhydrous particles become coated with the coating material and remain as distinct granules instead of forming solid masses as would otherwise happen.

A third method of operation of this invention consists in running relatively dilute caustic solutions into a bath of coating material maintained under vacuum at a high temperature. By virtue of the high temperature and vacuum, the water of the caustic liquor is caused to flash off into vapor, which is withdrawn. The anhydrous caustic formed appears as the characteristic granules.

Suitable materials for the coating agent comprise various oils and greases, such as light oil, lubricating oils, petroleum paraffin, diphenyl, etc. In general any material, which is inert to caustic, pyrogenetically stable, liquid at the temperature of operation, relatively non-volatile, and which tends to wet the surface of the apparatus, may be employed.

The coating material may be permanently retained on the granular anhydrous caustic if desired. However, it may also be removed by washing the product with an anhydrous and inert solvent. Any residual solvent retained by the caustic may be eliminated by evaporation in any suitable manner. If the volatility of the coating material is not too low, it may also be eliminated at least in part by simply heating the product to a fairly high temperature, preferably under vacuum. Vapor distillation with a suitable volatile material may also be employed to eliminate the coating material or the residual volatile solvent.

The following constitutes a specific example of the application of the invention:

Caustic soda solution was concentrated to a strength of 80 per cent by heating to a temperature of about 342 deg. F. and at a pressure of 4 inches of mercury. At this point, crystals of anhydrous caustic began to separate. A light petroleum oil having a boiling point of 200 to 203 deg. C. under a pressure of 4 m. m. of mercury was then added in the proportion of 100 parts by weight of oil per 100 parts of caustic soda (anhydrous basis).

The pressure was then gradually reduced over a period of about 1½ hours to two inches of mercury and simultaneously the temperature was increased to 460 deg. F. Elimination of water was continued until substantially all of the caustic was precipitated in anhydrous form.

Temperatures, pressures, time factors, and quantity and character of the coating agent may vary over a wide range if so desired. Those given in the example are merely illustrative.

Although only the preferred forms of the invention have been described, it will be apparent to those skilled in the art that numerous modifications may be made therein without departure from the spirit of the invention or the scope of the appended claims.

What we claim is:

1. An improvement in the process of dehydrating an aqueous solution of an alkali metal hydroxide at a pressure below 16 inches of mercury to insure precipitation of granules of alkali metal hydroxide during dehydration which comprises preventing substantial corrosion of the dehydrating equipment by the hydroxide and contamination of the hydroxide by mixing a non-reactive liquid coating agent, which is substantially nonvolatile at the temperature of dehydration, with the aqueous hydroxide and dehydrating said hydroxide, the concentration of said agent in the mixture being of sufficient magnitude to cause formation of a corrosion resistant film upon the walls of the evaporator and upon precipitated granules of the hydroxide 2. The process of claim 1 wherein the coating agent is a substantially nonvolatile oil.

3. The process of claim 1 wherein the granules are extracted with a volatile solvent to remove the agent therefrom.

IRVING E. MUSKAT.
DWIGHT R. MEANS.